Nov. 14, 1939.  L. W. IMM  2,179,822
BALANCE COMPUTER
Filed April 17, 1937  2 Sheets-Sheet 1
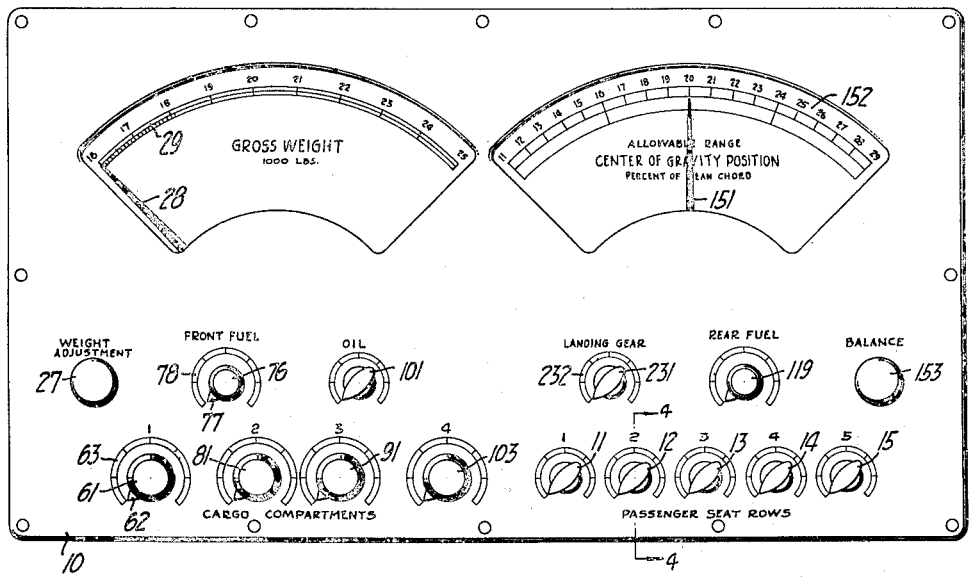
FIG_1_
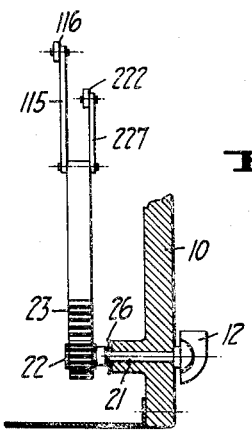
FIG_4_
INVENTOR.
Lewis W. Imm
BY
ATTORNEY.

Nov. 14, 1939.  L. W. IMM  2,179,822
BALANCE COMPUTER
Filed April 17, 1937  2 Sheets-Sheet 2
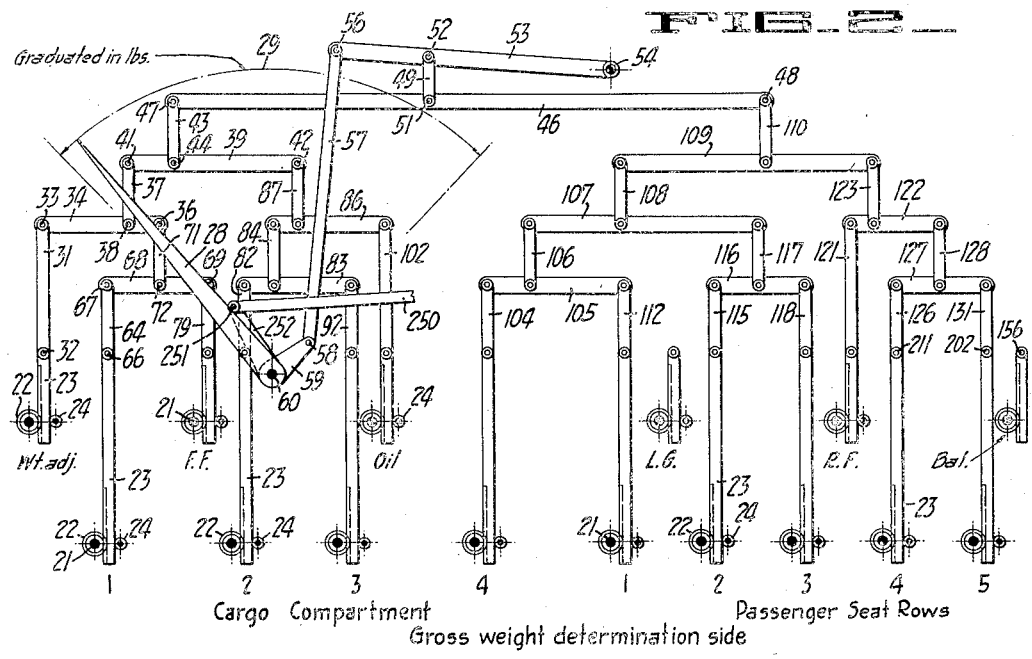
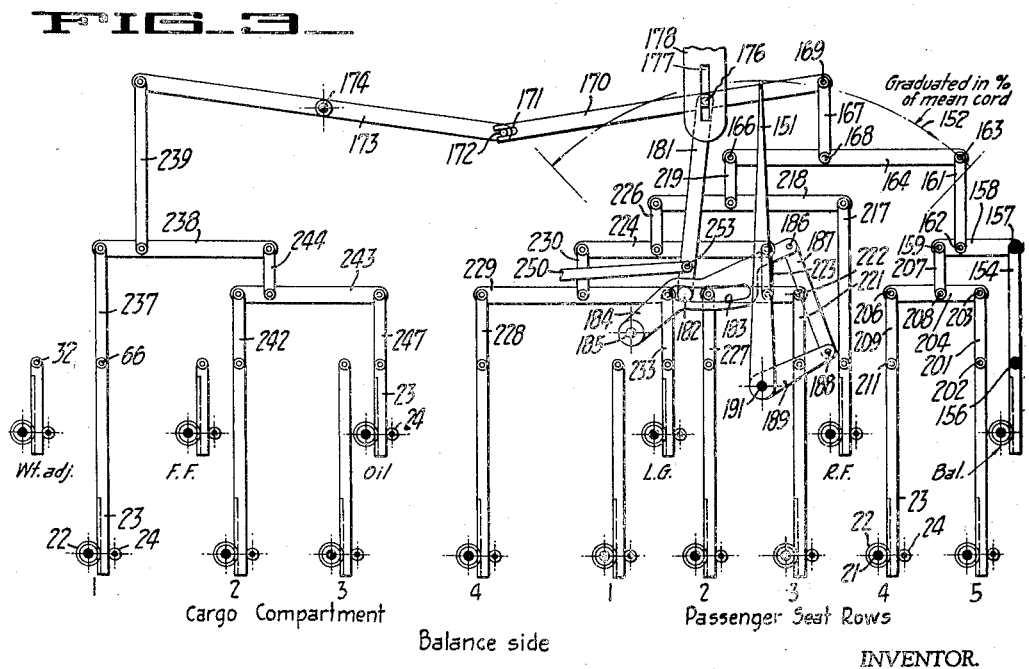
INVENTOR.
Lewis W. Imm
ATTORNEY.

Patented Nov. 14, 1939

2,179,822

UNITED STATES PATENT OFFICE 2,179,822

BALANCE COMPUTER

Lewis W. Imm, Inglewood, Calif.

Application April 17, 1937, Serial No. 137,577

14 Claims. (Cl. 235—61)

The present invention relates to computing mechanisms and has as its principal object the provision of a computing mechanism which will automatically indicate variations in the location of the load center of a craft or vehicle as cargo is stowed and passengers and crew are stationed in various locations with respect to the normal load center thereof.

Instruments embodying the invention are particularly useful in connection with aircraft, for indicating fore and aft displacements of the load center as the passenger, fuel, and cargo loads are disposed in the locations provided in the craft, and also for totaling these loads to present an indication of the gross weight of the loaded craft. Previously, the loading of transport planes has involved extended longhand computations for determining gross weight, and the fore and aft position of the load center for each particular distribution of the weights.

A further object of the invention is, therefore, to provide a visual indication of the fore or aft displacement of the load center of a vehicle under various load distributions.

A still further object of the invention is to provide a visual indication of the gross weight of a vehicle carrying a plurality of distributed loads.

A further and more specific object of the invention is to provide a visual indication of the location of the load center of a vehicle with reference to a selected part thereof.

The foregoing, together with other objects of the invention, are preferably accomplished by the provision of a control board carrying a plurality of manually adjustable indicators, each of which represents a separate fuel, cargo, or passenger location in a vehicle. Each indicator is settable to indicate the weight of the load carried in the location which it represents, and all are connected to control movable linkages, or the like, for totaling the indicated weights and automatically moving an indicator showing the gross weight of the loaded vehicle.

Such of these manually adjustable indicators as represent load locations removed from the load center of the unloaded vehicle, are also connected to control movable linkages, or the like, for algebraically totaling the moments produced about a selected point in the vehicle by the loads disposed at the locations represented by the several adjustable indicators, and effecting a registration (which may or may not be visually indicated) of the net total moment produced by the loading of the vehicle according to the setting of the adjustable indicators.

In order to obtain a visual indication of the distance through which the load center is displaced by such a load distribution, the net total moment thus obtained is divided by the gross weight of the loaded vehicle, the mechanism for effecting this computation being hereinafter described in detail. Indication of the result of the computation is effected by movement of any suitable indicating device, such as a hand movable over a scale, which may be graduated in any units of distance, but in air transport applications is preferably graduated in percentages of the mean wing chord length of the particular craft which is the subject of the calculation.

The novel features characteristic of the invention are set forth with particularity in the appended claims. The invention itself, however, together with additional objects and advantages thereof, will be best understood from the following description of a specific embodiment, when read in connection with the accompanying drawings, in which:

Figure 1 is a view in frontal elevation, of the control panel of an instrument embodying the present invention;

Figure 2 is a diagrammatic view in frontal elevation of the weight totalizing mechanism;

Figure 3 is a diagrammatic view in frontal elevation of the moment totalizing and computing mechanisms; and Figure 4 is a detail view of one of the setting devices.

The instrument illustrated in these drawings is designed particularly for use in calculations of the character described, with reference to a modern type of transport airplane having front and rear fuel and cargo spaces, and five lateral rows of seats in each row of which four passengers may be accommodated.

As shown in Figures 1 and 4 the panel 10 carries the several manually operable devices for setting the various weights into the instrument, including the five "passenger row" knobs 11 to 15 inclusive. The connections illustrated in Figure 4, whereby the passenger row knob 12 may adjust both the weight and moment totalizing mechanisms, is typical of the connections between the other setting devices and these mechanisms, except in special cases noted hereinafter.

These connections comprise the shaft 21 fixed to knob 12 and rotatably mounted in the panel 10. Fixed on the opposite end of shaft 21 is a pinion 22 meshing with a rack 23, retained in mesh with said pinion by means such as rollers 24 (Figures 1 and 2). This arrangement is such that rotation of the knob 12 will effect proportionate vertical movement of the rack 23, and in order to prevent inadvertent displacement thereof after knob 12 has been set, a frictional device such as the spring washer 26 may be used to resist rotation of the shaft 21.

The empty weight of the airplane with its crew, which is usually determined by actually each airplane at periodic intervals, is first set into the instrument by rotating the weight adjustment knob 27 (Figure 1) until this known gross weight is indicated by the hand 28 on the scale 29.

As shown in Figure 2, clockwise rotation of the weight adjustment knob 27 acts through its associated pinion 23 and rack 24 to pull link 31 pivotally connected at 32 to said rack and at 33 to a lever 34. Lever 34 is thus rocked about the pivot 36, which functions as a fixed pivot during this adjustment, and pulls a link 37 which is pivotally connected to lever 34 at 38, and to a lever 39 at 41. Lever 39 is thus rocked about the pivot 42, which also acts as a fixed pivot during this adjustment, and pulls a link 43 which is pivotally connected to lever 39 at 44 and to a lever 46 at 47. Lever 46 is thus rocked about the pivot 48, which also acts as a fixed pivot during this adjustment, and pulls a link 49 which is pivotally connected to lever 46 at 51 and at 52 to a lever 53 having a pivotal mounting on the frame of the instrument at 54. Lever 53 is pivotally connected at 56, adjacent its free end, to a link 57, the opposite end of which is pivotally connected at 58 to an arm 59 fixed to the arbor 60 on which is mounted the weight indicator hand 28, described above. The movement of the weight adjustment knob 27 is thus proportionately transmitted to this indicator hand, and adjustment of the knob to show the gross empty weight of the airplane with its crew may be readily effected.

With the individual load setting knobs set at zero, the balance adjustment knob is then adjusted until the load center indicator shows the normal load center of the craft, as will be described in detail after the description of the weight totalizing mechanism has been concluded.

After these preliminary adjustments have been effected, the weights which it is proposed to place in the various spaces therefor in the craft, are set into the instrument by adjusting the various knobs until their pointers indicate such weights on the individual scales associated with each pointer.

The first cargo compartment knob 61 adjacent the left side of the panel 10 is rotated clockwise until its pointer 62 indicates, on the scale 63, the weight of the baggage or other cargo which it is proposed to stow in that particular cargo compartment of the craft. The pinion 22 and rack 23 associated with this knob 61, are thus moved to pull link 64 pivotally connected at 66 to said rack, and at 67 to a lever 68, and thus rocks said lever about the pivot 69, as a fixed pivot, to pull link 71 pivotally connected to lever 68 at 72 and to lever 34 at 36. Lever 34 will therefore be rocked about its pivot 33, as a fixed pivot, imparting to links 37, 43, and 49 a movement proportionate to the weight of this part of the cargo, in addition to the movement imparted to said links by the initial adjustment of the weight adjustment knob 27. The various lever arms involved are so proportioned as to effect an additional movement of the weight indicator hand 28 proportionate to the weight of the added cargo, so that this hand will now indicate on its scale 29 the sum of the empty weight of the craft with its crew and the cargo which it is proposed to stow in the first cargo compartment.

In a similar manner, the weight of the fuel in the front fuel tank is set by rotating knob 76 until its pointer 77 indicates the proper weight on scale 78, this adjustment serving to move link 79, lever 68, link 71, lever 34, link 37, lever 39, link 43, lever 46, link 49, lever 53, link 57, and hand 28 in the same manner as the previously described adjustments to obtain an indication on scale 29 of the total of this weight and those previously set into the instrument.

As will be apparent from Figure 2, the weights proposed to be stowed in the remaining cargo, fuel, oil, and passenger locations will, upon similar appropriate adjustment of the individual knobs provided for setting these factors into the instrument, be added to the weights previously set, by movement of the illustrated linkages by means of which each of the knobs, except that representing the landing gear, may move the indicator hand 28. The weight of the landing gear is constant, but its location may be changed in a craft provided with retractable landing gear, and hence its knob is connected to the moment totalizing mechanism only, as hereinafter described.

From the foregoing detailed description of the leverage system appertaining to the weight adjustment, first cargo compartment, and front fuel tank knobs, the operation of the remaining elements of the illustrated system will be readily apparent. Each operates to rock lever 53 and advance hand 28 along its scale through the following levers and links, which will be briefly referred to.

The knob 81, representing the second cargo compartment, is connected to rock lever 53 through link 82, lever 83; link 84, lever 86; link 87, lever 39; link 43, lever 46; and link 49.

The knob 91, representing the third cargo compartment, is connected to rock lever 53 through link 92, lever 83, and thence through the links and levers described in connection with the knob 81 representing the second cargo compartment.

The knob 101, representing the oil tank, is connected to rock lever 53 through link 102, lever 86; link 87, lever 39; link 43, lever 46; and link 49.

The knob 103, representing the fourth cargo compartment, is connected to rock lever 53 in the same direction through link 104, lever 105; link 106, lever 107; link 108, lever 109; link 110, lever 46; and link 49.

The knob representing the first lateral row of four passenger seats is connected to rock lever 53 through link 112, lever 105, and thence through the system described in connection with the knob 103 representing the fourth cargo compartment.

The knob representing the second lateral row of passenger seats is connected to rock the lever 53 through link 115, lever 116; link 117, lever 107; link 108, lever 109; link 110, lever 46, and link 49.

The knob representing the third row of passenger seats is connected to rock the lever 53 through link 118, lever 116, and thence through the same system described above in connection with the second row of passenger seats.

The knob 119 representing the rear fuel tank is connected to rock the lever 53 through link 121, lever 122; link 123, lever 109; link 110, lever 46, and link 49.

The knob representing the fourth row of passenger seats is connected to rock lever 53 through link 126, lever 127; link 128, lever 122; link 123, lever 109; link 110, lever 46, and link 49.

The knob representing the fifth row of passenger seats is connected to rock the lever 53 through link 131, lever 127, and thence through the same system described above in connection with the knob representing the fourth row of passenger seats.

Since the maximum weights designed to be received in the locations represented by the several adjustable knobs differ, the calibration of the individual scales associated with these knobs will not usually be on the same scale. These differences in calibration however correspond to differences in the leverages of the lever systems by means of which the knobs move hand 28, so that, for instance a larger weight difference may be represented by a given movement of one of the cargo compartment knobs, than by an equal movement of one of the passenger row knobs. The leverages may be so varied in designing an instrument for a ship of any given weight capacity as to provide adjustable setting devices calibrated to the full capacity of each weight location.

It has been found unnecessary to effect extremely accurate setting of the individual adjustable knobs in an instrument designed for such use as that disclosed herein, and therefore, as will be seen on reference to Figure 1, it is sufficient to provide in connection with the passenger row knobs, scales showing merely the number of passengers in the lateral row represented by the knob. For such calculations as the present instrument is designed to perform, it is customary to assume the weight of passengers as averaging 170 pounds, and the leverages connecting these knobs with hand 28 are proportioned accordingly.

The hand 151 indicating the center of gravity position or load center, is movable over a scale 152 which is preferably graduated so that the load center position is indicated in terms of percentage of the mean wing chord of the airplane. That is, a certain percentage of the distance between the leading edge of the wing and the rear terminus of the wing chord. As mentioned hereinabove, it is initially positioned to indicate the normal load center of the airplane with its crew, by adjustment of the balance knob 153 (Figure 1) which acts, through its associated pinion 22 and rack 23, to pull link 154 (Figure 3).

Link 154 is pivotally connected at 156 to the said rack 23, and at 157 to lever 158 so that in the initial balance setting, lever 158 is rocked around its pivot 159, as a fixed pivot, to pull link 161, pivotally connected at 162 to lever 158, and at 163 to lever 164, to rock said lever 164 around its pivot 166, as a fixed pivot, and pull link 167 pivotally connected to lever 164 at 168, and at 169 to the moment totalizing lever 170.

The opposite end of the moment totalizing lever 170 is supported by engagement of a slot 171 therein with a pin 172 on lever 173 pivotally mounted in the frame of the instrument at 174. Thus it will be apparent that upon clockwise rotation of the balance knob 153, lever 170 may be rocked around pin 172 as a fixed pivot. It is, however, preferably constrained against lateral movement during such adjustment by means such as a pin 176 journaled in the lever 170 and having squared ends movable in vertical slots 177 in a frame member 178.

Pivotally mounted on the pin 176 is a link 181 adjacent the lower end of which there is carried a pin 182 extending into a slot 183 of lever 184 pivotally mounted on the frame at 185, the purpose of which will be described hereinafter.

The free end of lever 184 is pivotally connected at 186 to a link 187, the opposite end of which is pivotally connected at 188 to an arm 189 fixed on the arbor 191 carrying the indicator hand 151. This arrangement is such that, as the balance knob 153 is rotated in a clockwise direction to rock lever 170 about its support on pin 172, pin 176 will be moved downwardly in the slot 177, rocking lever 184 in a clockwise direction around its pivot 185, and advancing the indicator hand 151 in a clockwise direction along its scale 152 until the said hand indicates the normal center of gravity position, or load center of the airplane with its crew.

The several manually adjustable knobs representing cargo, fuel, and passenger locations disposed to the rear of the normal load center of the airplane, are connected by linkages, similar to those described in detail in connection with the gross weight totalization, to the link 167 adapted to lower the right end of the moment totalizing lever 170. In the present instrument these knobs comprise those representing the fourth cargo compartment, the rear fuel tank, and the second to fifth passenger seat rows. The adjustment knob representing the first passenger seat row is not connected to the moment totalizing mechanism at all since in the airplane for which the present instrument is designed, that passenger row is in the same vertical transverse plane as the normal load center of the airplane.

The leverage systems whereby the several adjustable knobs are connected to the moment totalizing mechanism are so proportioned that the movement transmitted to lever 170 by rotation of each of the knobs is proportioned, not only to the calibration of the individual scale associated with the knob in question as described in connection with the weight totalization mechanism, but also to the distance between the normal load center of the airplane and the several load locations represented by the individual knobs.

Thus, when the knob representing the fifth passenger row is rotated in a clockwise direction, it will act through its associated pinion 22 and rack 23 to pull link 201 pivotally connected at 202 to the rack 23 and at 203 to a lever 204 to rock said lever about 206, as a fixed pivot, and exert a pull on link 207 pivotally connected to lever 204 at 208, and at 159 to lever 158, and thence through the same system described in connection with the initial balance adjustment to lever 170.

The individual adjustment knob representing the fourth passenger row is connected to lever 204 by a link 209 pivotally connected to said lever at 206 and to the rack 23 associated with the adjustment knob representing the fourth passenger row at 211.

The calibration of the weight scales associated with the fourth and fifth passenger rows is the same, but it will be noted, on reference to Figure 3, that the distance between the pivot 203 and the pivot 208 is less than the distance between the pivot 206 and the pivot 208, and that therefore a given movement of the knob representing the fifth passenger row will produce a greater movement of lever 170 than will an equal movement of the knob representing the fourth passenger row. This is because in the airplane in which the instrument is designed for use, the fifth passenger row is further removed from the normal load center of the craft than is the fourth passenger row, and hence, if the loading of both said rows is equal, the weight in the fifth passenger row will produce the greater moment about the normal weight center. The two arms of lever 204 above referred to are therefore proportioned so that the movement of lever 170 effected by movement of these knobs, will be proportionate to the moment exerted by the load, and not to the weight thereof alone.

The adjustment knobs representing the remaining load positions disposed at the rear of the normal center of gravity of the airplane, are connected to move the link 167 connected to the right of lever 170 by similar moment totalizing lever systems which need be only briefly described.

The knob representing the rear fuel tank is connected to link 167 by link 217, lever 218; link 219, and lever 164.

The knob representing the third passenger row is connected to the link 167 by link 221, lever 222; link 223, lever 224; link 226, lever 218; link 219, and lever 164.

The knob representing the fourth cargo compartment is connected to the lever 167 by link 28, lever 229; link 230, lever 224; link 226, lever 218; link 219, and lever 164.

As mentioned hereinbefore, the retraction of the landing gear in airplanes fitted with retractable landing gear, has the effect of shifting its weight somewhat to the rear, and it is therefore desirable to provide a knob 231 cooperating with a scale 232, the calibrations of which indicate merely the retracted and lowered positions of the ship's landing gear. This knob is not connected to the weight totalizing mechanism since no change in the gross weight is involved, but the shifting of the weight to the rear involves an increased moment, and this knob is therefore connected by its associated pinion 22 and rack 23 to a link 233 pivotally mounted on lever 229 at such a distance from said lever's connection with the link 230 as to effect a movement of the latter proportionate to the change of moment effected by the shifting of the weight of the landing gear through the distance involved in the particular aircraft for which the instrument is designed. Thus the operator of the instrument may, by adjusting the knob 231, determine whether or not the retraction of the landing gear after takeoff will carry the load center out of the optimum or permissible range as indicated on the scale 152.

From the foregoing description it will be apparent that the adjustment of the setting knobs described will effect a totalization of all of the moments produced by loads disposed at the rear of the normal center of gravity position or load center of the aircraft for which the instrument is designed, and that the pin 176 will be moved downwardly in the slot 177 a distance proportionate to the total of said moments. The moments produced by loads disposed forwardly of the normal center of gravity position of the craft for which the instrument is designed, will have the effect of shifting the position of the load center in the opposite direction, and it is therefore necessary to provide means for totalizing these moments and subtracting their total from the total of the moments produced by the loads disposed at the rear of the normal center of gravity position.

For this purpose, as shown in Figure 3, the adjustment knobs representing the first and second cargo compartments and the oil tank, are connected by link and leverage systems similar to those hereinabove described to the lever 173 pivotally mounted on the frame at 174, and provided with pin 172 engaged in the slot 171 of lever 170. The adjustment of these knobs will therefore effect counter-clockwise movement of the lever 173 about its pivot 174, raising the left end of lever 170 and moving the pin 176 upwardly in its slot 177. The ultimate position of the pin 176 in its slot 177 will therefore constitute a registration of the algebraic total of the moments of the several loads removed from the normal center of gravity position of the airplane on both sides thereof.

The linkages whereby the above mentioned knobs representing loads disposed forwardly of the normal center of gravity position effect such movement of the lever 173, are similar to those described above in connection with the totalization of the moments produced by loads disposed at the rear of the normal center of gravity position, and a brief description thereof will therefore suffice.

The knob representing the first cargo compartment is connected to lever 173 by link 237, lever 238, and link 239.

The knob representing the second cargo compartment is connected to lever 173 by link 242, lever 243; link 244, lever 238, and link 239.

The knob representing the oil tank is connected to lever 173 by link 247, lever 243; link 244, lever 238; and link 239.

It will be observed that the knobs representing the front fuel tank and the third cargo compartment are not connected to the moment totalizing mechanism. This is because these loads as well as the load in the first passenger row are disposed in the same vertical transverse plane as the normal load center of the plane, and hence are not effective to alter the moment in either direction.

As has been pointed out above, the ultimate position of the pin 176 in its slot 177 constitutes a registration of the algebraic total of the moments produced by the several loads. In other words, this is a summation of the products of a plurality of multiplication operations, in each of which the factors are the magnitude of the load and its distances from the normal center of gravity position of the airplane. Therefore, in order to obtain an indication of the distance through which the load center will be displaced by a given distribution of loads of a known magnitude, it is necessary to divide this algebraic sum of products by the gross weight of the loaded airplane and to provide means for indicating the quotient in lineal terms.

For this purpose the weight totalizing mechanism is connected to the linkage whereby the moment totalizing devices control the center of gravity position indicator 151, so that as the total loaded weight of the craft increases the movement of the load center indicator effected by a given change in the algebraic total of the moments will decrease progressively.

Link 250 (Figure 2) is pivotally connected at 251 to an arm 252 fixed on the arbor 60 of the weight indicator hand 28, and is pivotally connected at its opposite end (Figure 3) at 253 to the link 181 which, as previously described, is pivotally mounted on the pin 176 and provided at its lower end with a pin 182 movable in the arcuate slot of lever 184.

In the position in which the parts are shown in Figure 3, the moment is zero, and movement of the link 181 by link 250 will therefore produce no movement of the load center indicator 151. It will be observed, however, that after any change of the total moment in either direction, an alteration of the total weight will serve to move the pointer 151, and that increases in the total weight will, by moving link 250 to the right, throw the pin 182 rightward in the slot 183 and decrease the amount of movement imparted to pointer 151, and that increases in the total ment indicated by the position of pin 176. At a zero weight registration (which happens to be beyond the capacity of the particular instrument illustrated, however) the link 250 would move the link 181 to the left until pin 182 would lie on a direct line between pivot 185 and pin 176 so that any change in the moment would theoretically produce an infinite movement of the pointer 151. In the instrument illustrated, the parts are so proportioned that if the moments remain at a constant value other than zero and the weight be doubled, the difference for which the load center is displaced is reduced by one-half, or proportionately reduced for various other changes in the weight total.

It will be evident from the foregoing description that the instrument provided by the present invention will give an instantaneous visual reading of the weight of an airplane, or other vehicle carrying distributed loads, and the corresponding location of the center of weight measured in terms of the distance thereof from some particular reference point, for any proposed distribution of the individual loads. While the illustrated instrument is calibrated to measure the position of the load center in terms of percentage of the mean wing chord, it can, of course, be calibrated to measure the position of the load center from any convenient reference point, and would be so calibrated in the case of a wingless airplane such as an autogiro.

While the horizontal position of the center of gravity measured from a fore and aft direction is all that is required for the proper balance of aircraft at the present time, the instrument is capable of modification to provide similar readings of the horizontal position of the center of gravity in a lateral direction and the vertical position of the center of gravity in addition thereto, if desired.

Therefore, although a certain specific embodiment of the invention has been shown and described herein, it will be apparent to those skilled in the art that many modifications of the application thereof, as well as of the details of construction, is possible. The invention, therefore, is not to be considered as restricted to the form disclosed except in so far as it is necessitated by the prior art and by the spirit of the appended claims.

I claim:

1. A load center computer comprising suitable weight registering means, multiplying means operable by said weight registering means to compute the moment exerted by the registered weight about a predetermined point, and mechanism controlled jointly by said weight registering means and said multiplying means for quantitatively indicating displacement of the load center.

2. A load center computer comprising a plurality of suitable weight registering devices, multiplying means controlled by said devices for computing and algebraically totalizing the moments, about a predetermined point, of a plurality of weights registered upon said devices and so located with respect to said point as to produce moments of different sign character, means controlled by said devices for totalizing said weights, and mechanism controlled jointly by said moment and weight totalizing means for quantitatively indicating displacement of the load center.

3. In a computer of the class described, means for multiplying a plurality of factors, means controlled by said multiplying means for totalizing a plurality of products of said multiplications, means for totalizing a plurality of items, and means controlled by said product totalizing means and said item totalizing means for dividing the total of said products by the total of said items and indicating the quotient of said product total and said item total.

4. In a computer of the class described, means for multiplying a plurality of positive or negative factors, means controlled by said multiplying means for algebraically totalizing a plurality of positive and negative products of said multiplications, means for totalizing a plurality of items, and means controlled by said product totalizing means and said item totalizing means for dividing the algebraic total of said products by the total of said items and indicating the value and sign character of the quotient of said product total and said item total.

5. In a computer of the class described, item entering mechanisms, factor representing devices, means controlled by said mechanisms and said devices for multiplying each of the items entered by said mechanisms by one of the factors represented by said devices, means controlled by said multiplying means for totalizing the products of said multiplications, means controlled by said mechanisms for totalizing the items entered thereby, and means controlled by said product totalizing means and said item totalizing means for indicating the quotient of said product total and said item total.

6. In a computer of the class described, item entering mechanisms, factor representing devices, means controlled by said mechanisms and said devices for multiplying each of the items entered by said mechanisms by one of the factors represented by said devices, means controlled by said multiplying means for algebraically totalizing positive and negative products of said multiplications, means controlled by said mechanisms for totalizing the items entered thereby, and means controlled by said product totalizing means and said item totalizing means for indicating the value and sign character of the quotient of said product total and said item total.

7. In a computer of the class described, a plurality of differentially movable control members adapted to be set to represent one group of factors in a calculation, a primary differentially movable moment totalizing element, means connecting said element and a plurality of said members, for effecting movement of said element proportional to the sum of the individual movements of said connected members, each multiplied by a different predetermined factor, a secondary differentially movable moment totalizing element, means connecting said latter element and a plurality of said members, for effecting movement of said latter element proportional to the sum of the individual movements of the last mentioned members, each multiplied by a different predetermined factor, means settable under joint control of said primary and secondary moment totalizing elements for registering the sign character of and amount of the difference of the moment values represented by the positioning of said elements, means settable to register the sum of the factors represented by the setting of said control members, and means controlled jointly by said last mentioned registering means and by said moment difference registering means for indicating the sign character and value of a function of the values registered by both said registering means.

8. In a computer of the class described, a plurality of differentially movable control members adapted to be set to represent one group of factors in a calculation, a primary differentially movable moment totalizing element, means connecting said element and a plurality of said members, for effecting movement of said element proportional to the sum of the individual movements of said connected members, each multiplied by a different predetermined factor, a secondary differentially movable moment totalizing element, means connecting said latter element and a plurality of said members, for effecting movement of said latter element proportional to the sum of the individual movements of the last mentioned members, each multiplied by a different predetermined factor, means settable under joint control of said primary and secondary moment totalizing elements for registering the sign character of and amount of the difference of the moment values represented by the positioning of said elements, means settable by said control members to register the sum of the factors represented by their respective settings, and means controlled jointly by said last mentioned registering means and by said moment difference registering means for indicating the sign character and value of a function of the values registered by both said registering means.

9. In a computer of the class described, a plurality of differentially movable control members adapted to be set to represent one group of factors in a calculation, a differentially movable moment totalizing element, a plurality of motion transmitting devices connecting said moment totalizing element and said members respectively, for effecting movement of said element proportionate to the sum of the individual movements of said members, each multiplied by a different predetermined factor, a differentially movable weight registering element settable to register the sum of the factors represented by the setting of said control members, and means jointly controlled by said moment totalizing element and said weight registering element for indicating the value of a function of the values registered by the respective differential positioning of said elements.

10. In a computer of the class described, a plurality of differentially movable control members adapted to be set to represent one group of factors in a calculation, a differentially movable moment totalizing element, a plurality of motion transmitting devices connecting said moment totalizing element and said members respectively, for effecting movement of said element proportionate to the sum of the individual movements of said members, each multiplied by a different predetermined factor, a differentially movable weight registering element, a plurality of motion transmitting devices connecting said weight registering element and said control members respectively, for effecting movement of said element proportionate to the sum of the individual movements of said control members, and means jointly controlled by said moment totalizing element and said weight registering element for indicating the value of a function of the values registered by the respective differential positioning of said elements.

11. In a computer of the class described, a plurality of differentially movable control members adapted to be set to represent one group of factors in a calculation, a primary differentially movable moment totalizing element, means connecting said element and a plurality of said members, for effecting movement of said element proportional to the sum of the individual movements of said connected members, each multiplied by a different predetermined factor, a secondary differentially movable moment totalizing element, means connecting said latter element and a plurality of said members, for effecting movement of said latter element proportional to the sum of the individual movements of the last mentioned members, each multiplied by a different predetermined factor, and means settable under joint control of said primary and secondary moment totalizing elements for registering the sign character of the difference of the moment values represented by the positioning of said elements.

12. In a computer of the class described, a plurality of differentially movable members adapted to be set to represent one group of factors in a calculation, a primary differentially movable totalizing element having control devices associated therewith comprising motion transmitting means connecting one of said members with said element for effecting movement of said element proportionate to the movement of said member multiplied by a predetermined factor, and motion transmitting means connecting another of said members with said element for effecting additional movement of said element proportionate to the movement of said last named member multiplied by a different predetermined factor; a secondary differentially movable totalizing element having control devices associated therewith corresponding to the above mentioned devices associated with said primary totalizing element; and connecting means between said primary and secondary totalizing elements whereby movement of said secondary totalizing element by its associated control devices moves said primary totalizing element in a direction to subtract from the movement of the latter effected by its associated control devices.

13. A load center computer comprising settable weight registering means, settable weight-movement registering means, multiplying means operable by said weight registering means to compute the moment exerted by the registered weight about a predetermined point, mechanism controlled jointly by said weight registering means and said multiplying means for quantitatively indicating displacement of said load center, and means controlled by said weight-movement registering means for altering the setting of said last named means to quantitatively indicate displacement of the load center effected by movement of a predetermined weight with respect to said load center.

14. A load center computer comprising a plurality of settable weight registering devices, a settable weight-movement registering device, multiplying means controlled by said weight registering devices for computing and algebraically totalizing the moments, about a predetermined point, of a plurality of weights registered upon said weight registering devices and so located with respect to said point as to produce moments of different sign character, means controlled by said weight registering devices for totalizing said weights, mechanism controlled jointly by said moment and weight totalizing means for quantitatively indicating displacement of the load center, and means controlled by said weight-movement registering means for altering the setting of said mechanism so as to quantitatively indicate displacement of the load center effected by movement of a predetermined weight with respect to said load center.

LEWIS W. IMM.